United States Patent [19]

Landgraf

[11] Patent Number: 5,512,254
[45] Date of Patent: Apr. 30, 1996

[54] FLOATING DIELECTRIC PLATE

[76] Inventor: Peter C. Landgraf, 3650 Morgan Terr. Rd., Clayton, Calif. 94517

[21] Appl. No.: 364,811
[22] Filed: Dec. 27, 1994
[51] Int. Cl.⁶ ................................................ B01J 19/12
[52] U.S. Cl. .................................... 422/186.07; 422/907
[58] Field of Search .......................... 422/186.07, 186.11, 422/907

[56] References Cited

U.S. PATENT DOCUMENTS

| | | | |
|---|---|---|---|
| 4,545,960 | 10/1985 | Erz et al. | 422/186.12 |
| 4,606,892 | 3/1986 | Bachhofer et al. | 422/186.2 |
| 4,666,679 | 5/1987 | Masuda et al. | 422/186.2 |
| 4,882,129 | 11/1989 | Andrews et al. | 422/186.2 |
| 4,970,056 | 11/1990 | Wooten et al. | 422/186.07 |
| 5,211,919 | 5/1993 | Conrad | 422/186.07 |
| 5,366,702 | 11/1994 | Rimpler | 422/186.07 |

Primary Examiner—Donald P. Walsh
Assistant Examiner—Daniel Jenkins
Attorney, Agent, or Firm—Larry D. Johnson

[57] ABSTRACT

A floating dielectric plate used in the production of ozone in an ozone generator using the flat plate corona discharge method. The floating of the dielectric plate (4) is created or produced using the window gasket (5) which lays around the dielectric plate (4) and produces a window clearance (12) for the dielectric plate between the corona discharge space gasket (3) and the back up gasket (7) with electric contacts (6).

1 Claim, 3 Drawing Sheets

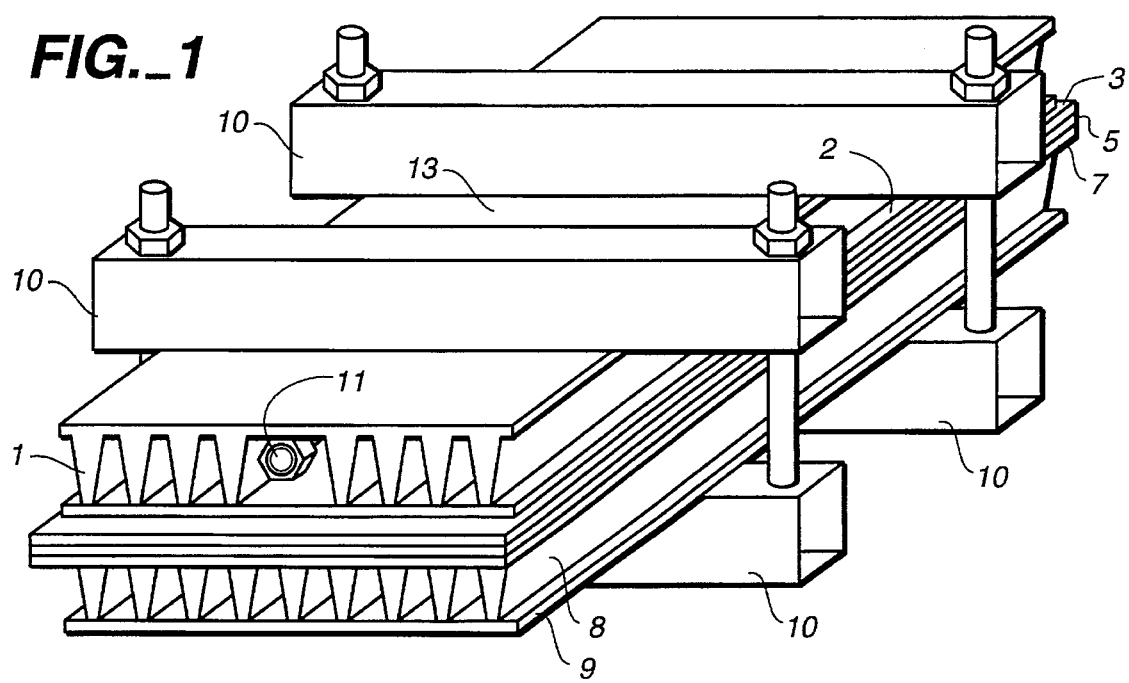
FIG._1
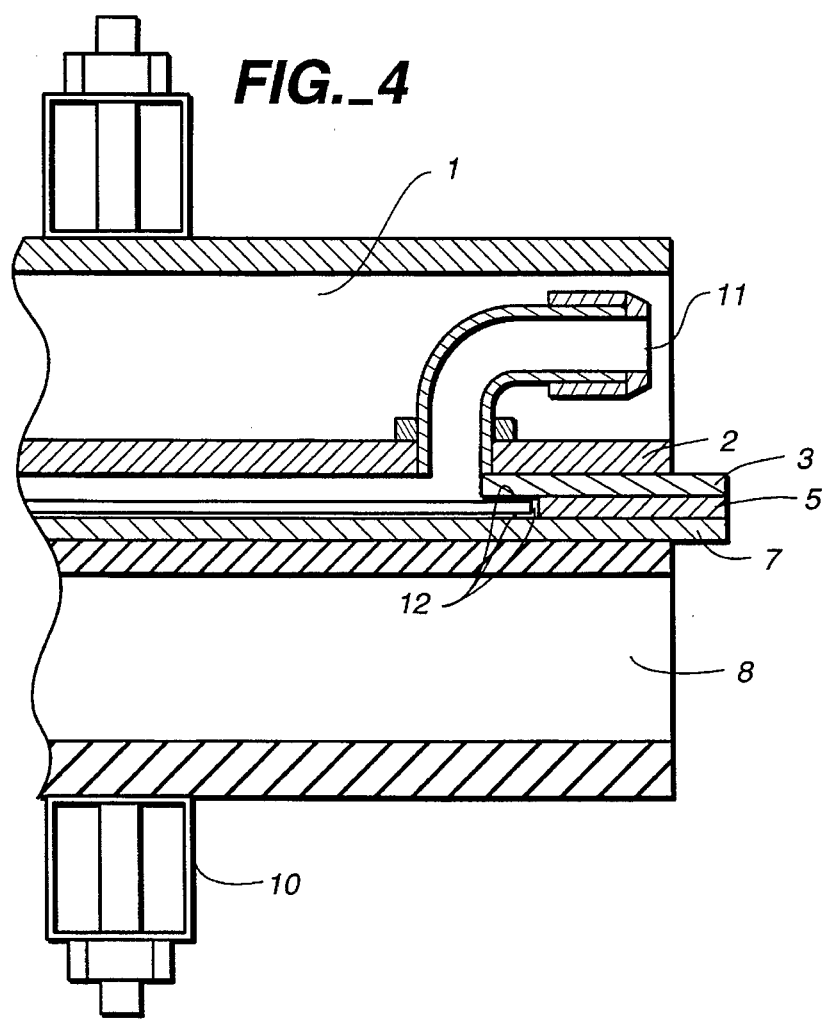
FIG._4

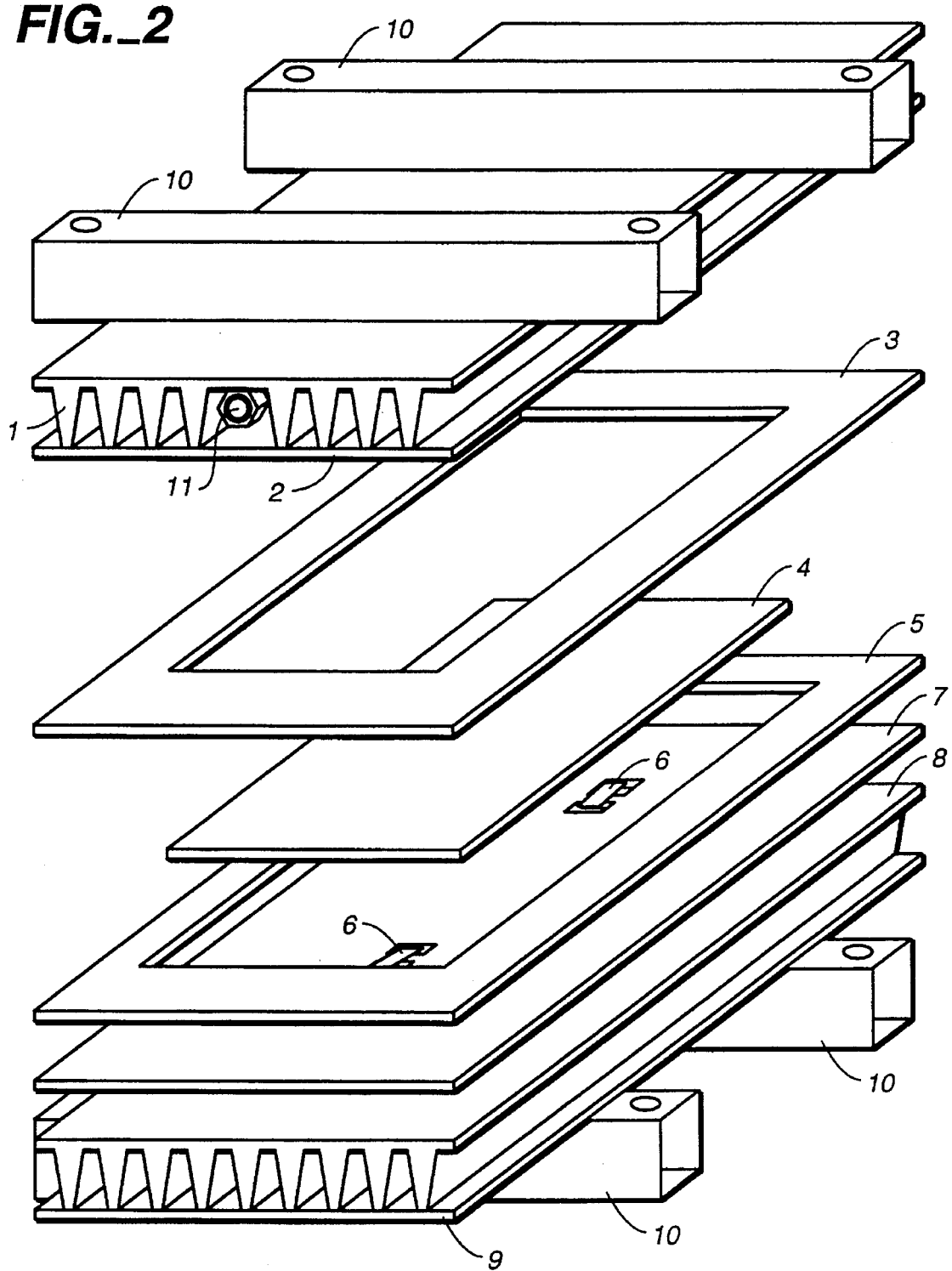
FIG._2

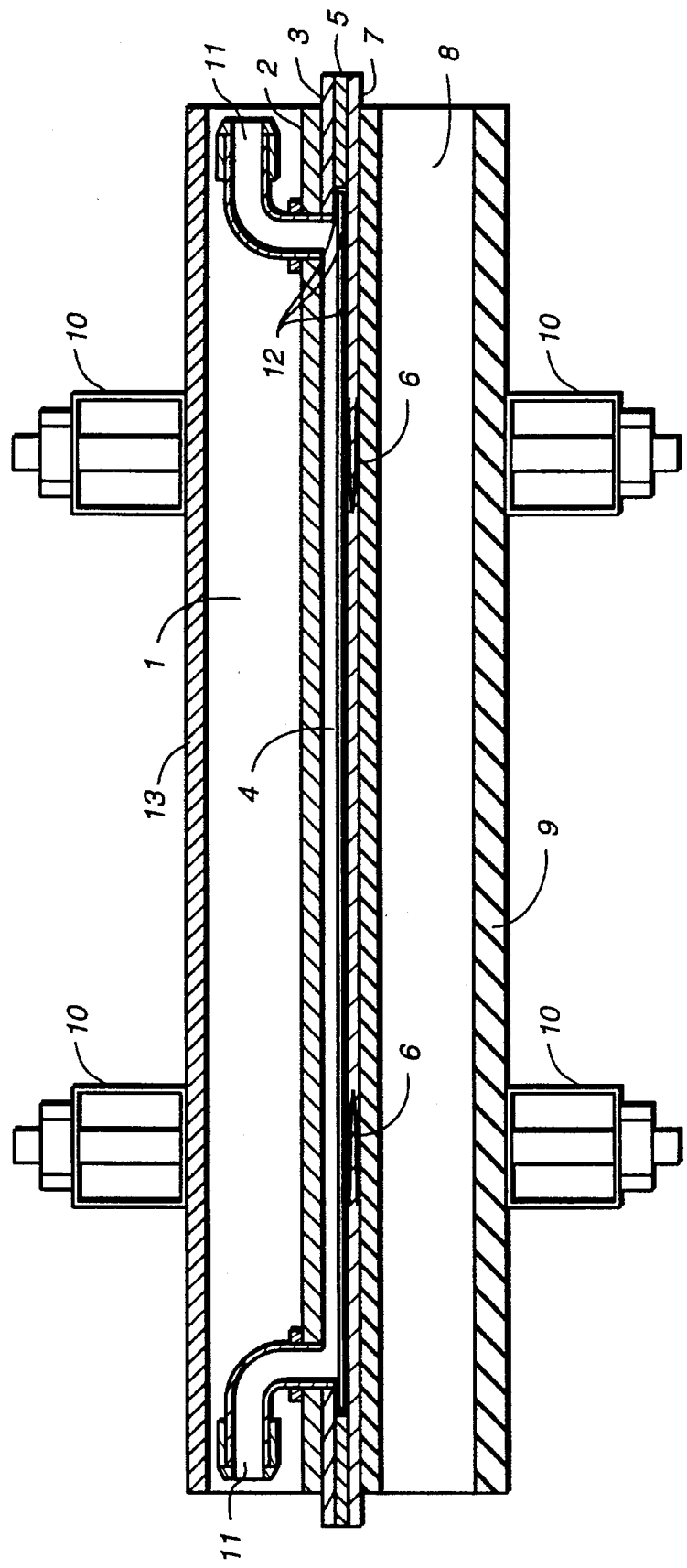
FIG._3

FLOATING DIELECTRIC PLATE

BACKGROUND OF THE INVENTION

1. Field of Invention

This invention relates to an apparatus and a method for the production of Ozone from a floating dielectric plate, specifically to use in a flat plate corona discharge ozone generator.

2. Description of Prior Art

An ozone generator with corona discharge uses a dielectric plate made from ceramic, glass or other insulating material. This allows ozone to be produced in the most cost effective manner.

Currently the dielectric plate is clamped and held rigged between the layers of gaskets. This creates stress on the dielectric plate due to temperature variations. In addition, stress and failure of the clamped dielectric plate is caused by a vacuum or pressure which cannot be relieved because of an inherent seal existing between the dielectric plate and counterpart due to the clamping. To combat the stress and breakage of the dielectric plate, the dielectric plate is made with increased thickness. This in turn causes a number of disadvantageous conditions.

(a) higher voltage is required to pass through the thicker dielectric plate to produce the ozone;

(b) due to higher voltage, temperatures increase within the corona discharge gap causing ozone destruction;

(c) lower production of ozone due to the above requires a larger surface area of the dielectric plate and a larger transformer to increase production thereby a larger ozone generator and increased production costs for the manufacturer of ozone generators;

SUMMARY OF THE INVENTION (a) to provide a ozone generator with minimal breakage or failure of the dielectric plate;

(b) to provide a lower energy consumption ozone generator;

(c) to provide an ozone generator with a higher ozone production output;

(d) to provide a smaller ozone generator which end users can more easily mount, store, or handle;

All the above advantages allow for a lower cost unit to be produced and therefore a competitive edge in the marketplace.

OBJECTS

Accordingly, the reader will see that the floating dielectric plate of this invention provides increased production of ozone because of the ability to use a thinner dielectric plate. In addition, this provides a longer lasting unit to the end user due to a significant reduction in stress on the fragile dielectric plate. Furthermore, the floating dielectric plate has the additional advantages in that it permits the manufacture of a smaller ozone generator having the advantages of production cost, shipping cost, and facility costs;

it permits reduced energy consumption;

it permits reduced operation and maintenance costs;

FEATURES

Although the description above contains many specificity's, these should not be construed as limiting the scope of the invention but as merely providing illustrations of some of the presently preferred embodiments of this invention. For example the ozone generator can have other shapes or thickness as well as use other clamping devices, insulation materials, or conductive materials.

Thus the scope of the invention should be determined by the appended claims and their legal equivalents, rather than by the examples given.

BRIEF DESCRIPTION OF THE DRAWINGS

FIG. 1 is a frontal, perspective view of the ozone generator including the closure clamping;

FIG. 2 is a frontal, exploded view of the ozone generator;

FIG. 3 is a frontal, cross sectional view of the ozone generator unit;

FIG. 4 is an enlarged view of the right hand side of FIG. 3;

DESCRIPTION OF THE DEFINED EMBODIMENT

Referring now to FIG. 1, the electrode assembly 13 of the present invention is comprised of a plurality of closure clamps 10 which holds the ozone generator for mounting as well as clamps the unit together by putting pressure on the upper heat sink 1 and the insulator plate 9. The present invention is similar to current ozone generators in that it uses the following a upper heat sink 1 to disperse heat; a titanium or other material plate 2 to act as conductor of heat, the outflow of the produced Ozone, and the ground for the electricity used in the unit; a corona discharge space gasket 3 which lays against the dielectric plate 4 and provides the spacing for production of Ozone as well as a seal; and the lower heat sink 8 which is normally used as the electric contact for the dielectric plate 4.

The present invention is different in that it incorporates a window gasket 5 which provides the dielectric plate 4 the space to float and allows the vacuum or pressure in the corona discharge gap to equalize do to its window clearance 12. The back up gasket 7 provides the seal. The back up gasket 7 contains small holes which the electric contacts 6 sit in and current can therefore pass from the lower heat sink 8 through electric contacts 6 and then pass to the foil on the dielectric plate 4. The dielectric plate 4 then disperses the current as it passes through it and ozone is produced when air or oxygen crosses the corona discharge gap. The ozone is then funneled or directed into the outlet 11 air passage which is mounted in the titanium plate 2.

The window gasket 5 is the key component to the present invention. It provides a clearance 12 for the dielectric plate 4 between the corona discharge space gasket 3 and the backup gasket 7. This provides clearance for the dielectric plate resistance. This window clearance 12 also allows the balance of vacuum or pressure in the corona discharge gap to be on both sides of the dielectric plate therefore unnecessary stress on the dielectric plate is eliminated This elimination of stress allows a thinner dielectric plate to be used and more current therefore can pass through the dielectric plate and produce a greater amount of ozone.

I claim:

1. An ozone generator comprising:

a first insulating member;

a first electrode disposed on said first insulating member;

a second insulating member;

a second electrode disposed on said second insulating member;

a corona discharge space gasket positioned adjacent to said first electrode;

a backup gasket positioned adjacent to said second electrode, said backup gasket having at least one aperture for passage of an electric contact from said second electrode;

a window gasket separating said corona discharge space gasket and said backup gasket and creating a clearance therebetween; and a dielectric plate positioned in said clearance between said corona discharge space gasket and said backup gasket, said dielectric plate isolated from said corona discharge space gasket and said backup gasket, said dielectric plate contacting said electric contact;

wherein said window gasket provides a clearance for the dielectric plate between the corona discharge space gasket and the backup gasket so as to allow the dielectric plate to shift when heating and cooling without resistance.

* * * * *